United States Patent [19]

Earnest

[11] 4,067,189

[45] Jan. 10, 1978

[54] MULTICYCLE TURBINE ENGINE

[75] Inventor: Ernest R. Earnest, Hobe Sound, Fla.

[73] Assignee: The Hydragon Corporation, Lake Park, Fla.

[21] Appl. No.: 532,747

[22] Filed: Dec. 16, 1974

[51] Int. Cl.² .................................................. F02C 7/02
[52] U.S. Cl. .................................. 60/39.18 B; 60/721
[58] Field of Search ................... 60/39.18 B, 670, 671, 60/650, 651, 655, 39.18 R, 39.18 A, 39.18 C, 721

[56] References Cited

U.S. PATENT DOCUMENTS

| | | | |
|---|---|---|---|
| 3,194,015 | 7/1965 | Pacault | 60/39.18 B |
| 3,303,646 | 2/1967 | Southam | 60/671 X |
| 3,500,636 | 3/1970 | Craig | 60/39.18 B |

*Primary Examiner*—Allen M. Ostrager
*Attorney, Agent, or Firm*—Harness, Dickey & Pierce

[57] ABSTRACT

An engine having a main power turbine operating on the Brayton cycle, has its air supply furnished by a compressor independently driven by a Rankine turine which derives its heat energy from the exhaust of the Brayton turbine. The engine is constructed in modules. One module consists primarily of a single stage Brayton turbine, with an output gearing system, and a coaxial extension containing an intercycle heat exchanger. A second module comprises a single stage Rankine turbine and a single stage compressor driven thereby for supplying air to the Brayton turbine, a feed pump for the Rankine fluid interposed between the Rankine turbine and the compressor, and accessory devices driven by the Rankine turbine for starting the engine. The second module has its axis perpendicular to the axis of the first-mentioned module. A condenser-regenerator module is disposed in a plane perpendicular to the axis of the second module and parallel to the axis of the first-mentioned module. A burner and air supply unit extends between the first and second modules generally parallel to the condenser-regenerator module.

6 Claims, 6 Drawing Figures

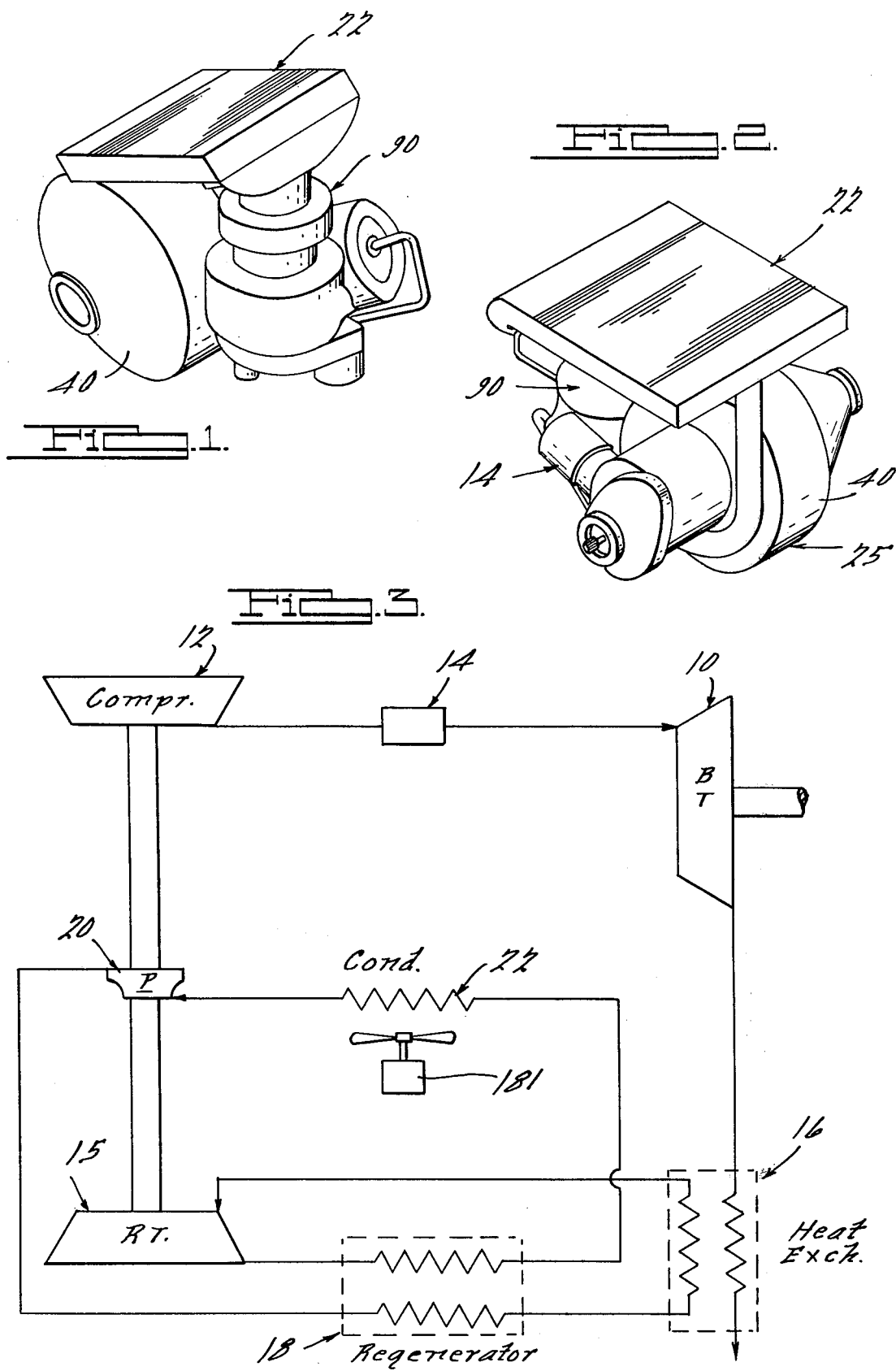

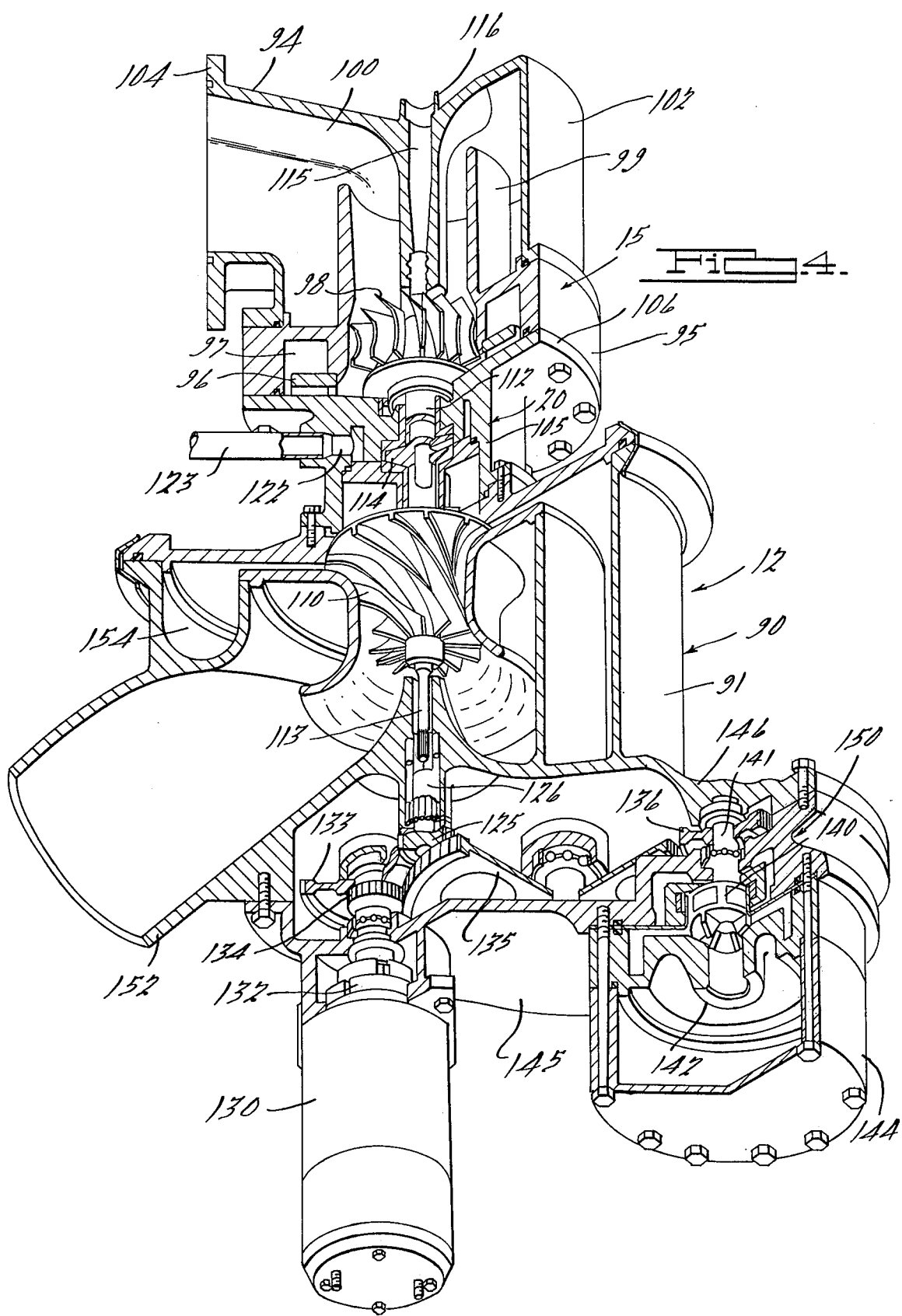

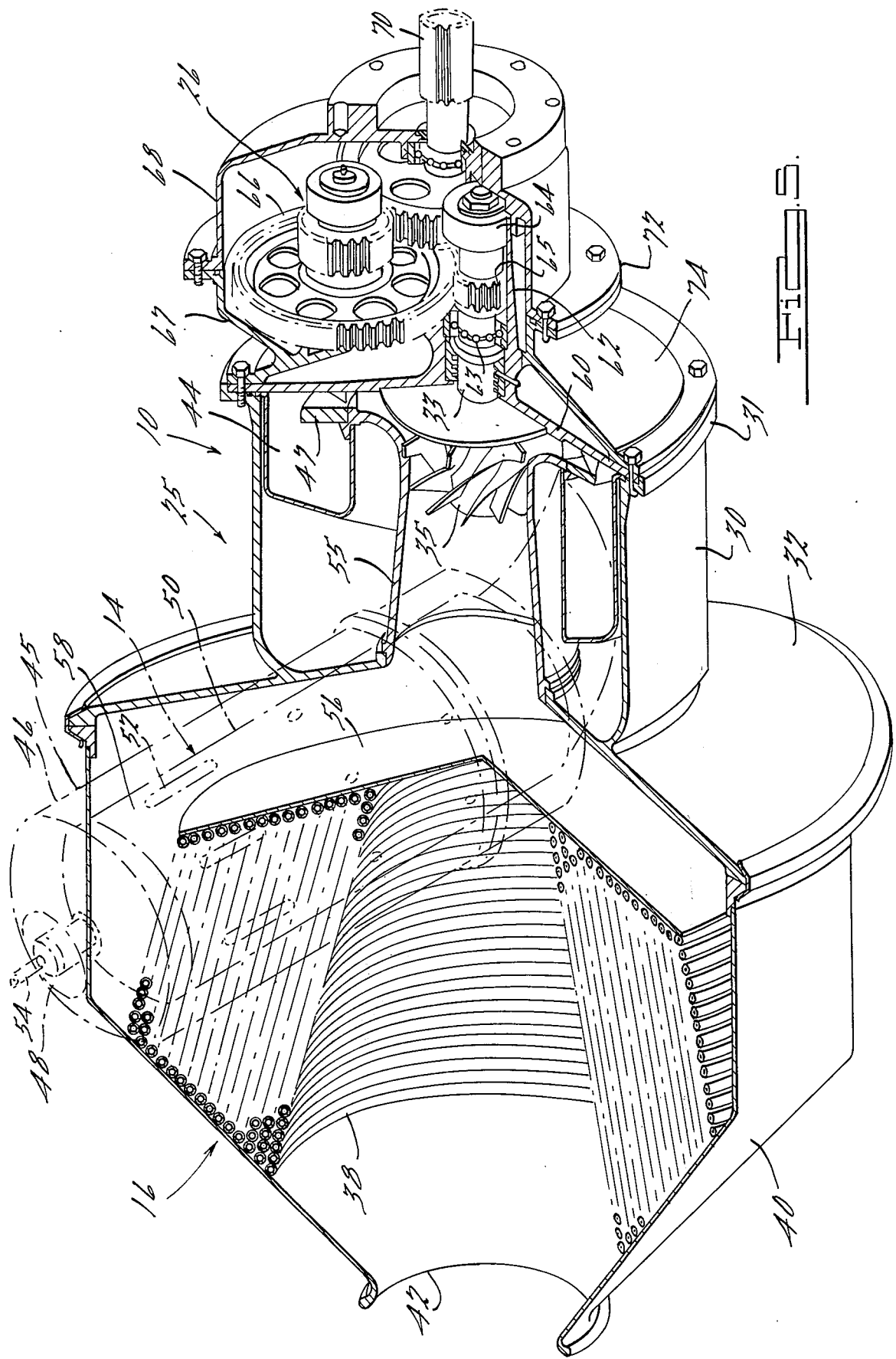

MULTICYCLE TURBINE ENGINE

BACKGROUND OF THE INVENTION

In the effort to produce compact power plants of high efficiency suitable for use in automotive vehicles, and which have low pollution factors, attention has been given to compound Brayton-Rankine cycle engines, although in the past these have been primarily constructed in a manner which, because of the size and weight of the components, has confined the use of such compound cycle engines to stationary power plants and the like. In the copending application of Ernest R. Earnest, Ser. No. 439,149, filed Feb. 4, 1974, now abandoned an engine of the indicated class is disclosed utilizing single stage Brayton and Rankine turbines, and a single stage compressor for the Brayton turbine driven by the Rankine turbine and mechanically independent of the Brayton turbine, the Rankine system being charged with an organic working fluid having physical characteristic selected to maximize the efficiency of the Rankie turbine, and of the compressor for the Brayton turbine, when these two components are running at the same predetermined speed. The present invention has as its overall object to improve power plants of the indicated character with respect to compactness and cost, and to provide an improved arrangement for handling the Rankine fluid which effectively seals the fluid within the system. A related object is to provide such an engine having overall dimensions which are relatively uniform in all three planes so that it can be accommodated in a space which is substantially cubic.

Other objects and advantages will become apparent upon consideration of the present disclosure in its entirety.

BRIEF DESCRIPTION OF THE FIGURES OF DRAWING

FIG. 1 is a somewhat diagrammatic perspective view of an engine constructed in accordance with the present invention:

FIG. 2 is a view similar to FIG. 1 from the other side of the engine;

FIG. 3 is a schematic diagram;

FIG. 4 is a longitudinal sectional perspective view of the subassembly comprising the Rankine turbine-Brayton compressor-feed pump and accessory drive module;

FIG. 5 is a view similar to FIG. 4 showing the intercycle heat exchanger-Brayton turbine and gear box module.

DETAILED DESCRIPTION OF PREFERRED FORM OF THE INVENTION

Figure 6:
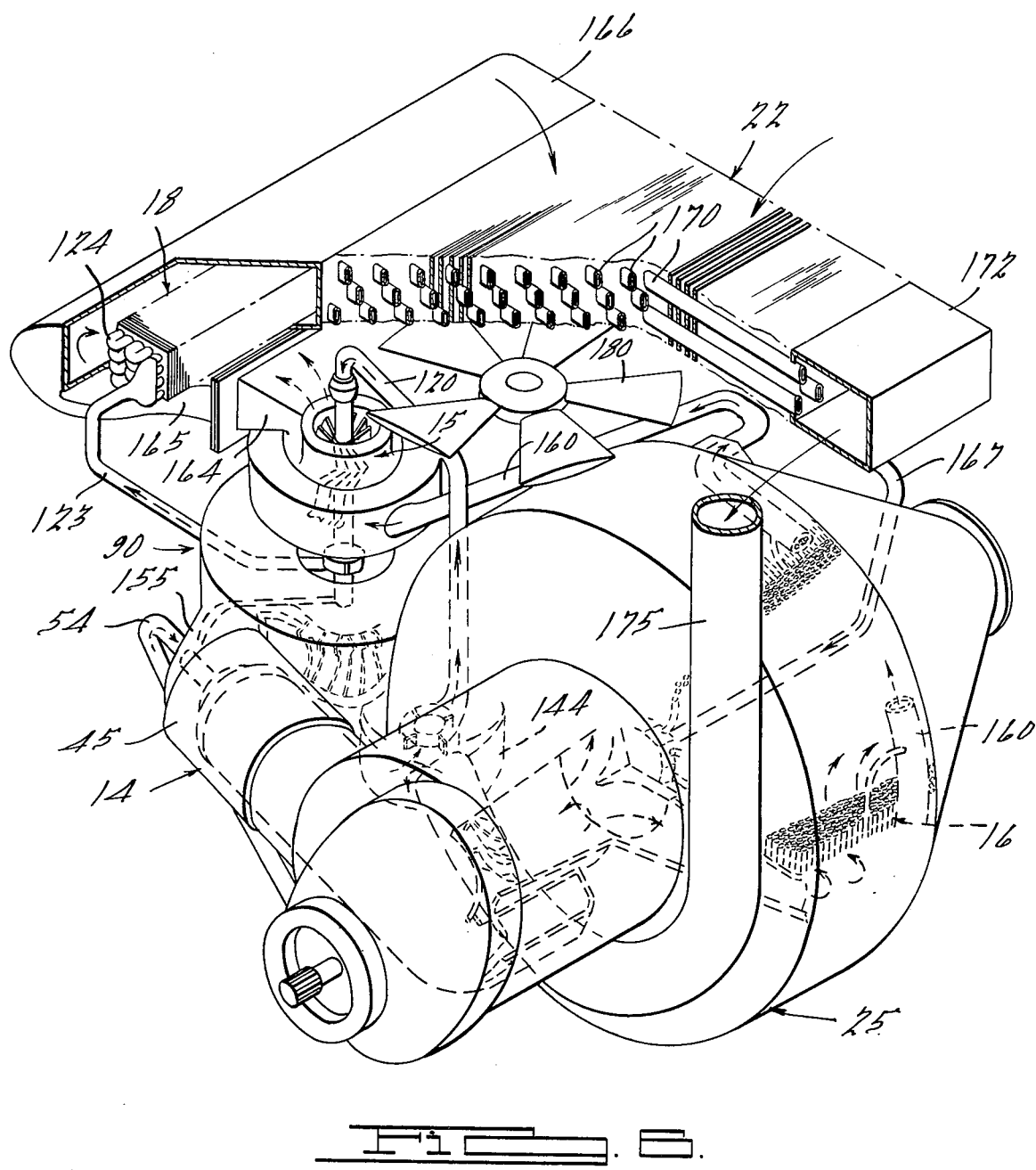
FIG. 6 is a somewhat diagrammatic phantom perspective view, partly broken away, showing the flow paths and relationships of the several fluids.

The basic components, as brought out in FIG. 3, comprise a main power turbine 10 which operates on the Brayton cycle, a compressor 12 for supplying air to the Brayton turbine, a burner assembly 14 interposed between the compressor outlet and the inlet of turbine 10, a Rankine turbine 15 direct coupled to compressor 12, an intercycle heat exchanger 16, and a regenerator 18. The Rankine system includes a pump 20 for circulating the Rankine fluid, which derives its heat principally from the exhaust of the power turbine 10. The Rankine fluid is recirculated through a condenser 22.

The main power turbine 10 and intercycle heat exchanger 16 are incorporated in a module generally designated 25 and which also includes an output reduction gear assembly generally designated 26 (FIG. 5). The components 10, 16, 26 are attached to and carried by a housing and support structure which comprises a generally cylindrical portion 30 which houses the Brayton turbine, an integral flat circular flange 32 at one end thereof which supports the heat exchanger 16 and an extension housing structure at the other end in which the shaft 33 and output gear train 26 for the turbine rotor 35 is journaled.

The intercycle heat exchanger is constructed in accordance with the disclosure of my copending Application Ser. No. 441,666, filed Feb. 11, 1974, and includes a plurality of tubes 38 contained within a shell-like housing portion 40 which is attached to flange 32 and through which the exhaust gas from the turbine 10 is conducted in such manner that it efficiently heats the tubes 38 and the Rankine fluid therein before being discharged from the axisl outlet 42.

The air and products of combustion are delivered to the inlet chamber 44 of the turbine 10 from the burner assembly 14 which has a concentric air jacket 45 and which extends laterally and generally tangentially from the housing portion 30 as indicated in broken lines in FIG. 5, and as shown in full lines in FIG. 6. The air jacket 45 of the burner assembly has an axial air inlet 48 at its outer end. The burner body 50 has its concentric cylindrical wall spaced inwardly from jacket 45 to permit some of the air to pass therearound; a part of the air also entering the burner body through suitable secondary air openings 52 therein. Fuel is delivered axially into the burner through a supply tube 54 which extends centrally through the primary air inlet opening 48. The air and products of combustion from the burner enter the turbine inlet scroll chamber 44, to which the outlet of the burner and air inlet assembly is directly connected, pass through the nozzle ring 47, and are discharged axially. The exhaust from the turbine impeller 35 is guided axially through a diverging central passage defined by a conically flared wall 55 within casing portion 30 and is then radially outwardly deflected by the circular baffle 56 in the heat exchanger 16, so that the exhaust flows to the annular outer passage 58 which extends around the outside of the circular tubing assembly 38 of the heat exchanger, and then radially inwardly between and around the tubes to the axial exhaust opening 42.

A generally flat end wall portion 60 at the opposite end of the turbine casing portion 30 is attached to a flange 31 on the casing portion 30 and has an axially extending integral bearing supporting neck portion 62 extending outwardly therefrom in which the shaft 33 is journaled by means of suitable anti-friction bearings 63, 64. A gear 65 fast on the shaft 33 drives a reduction gear cluster 66 which in turn drives the output shaft 70, the gear cluster and output shaft being journaled in an extension housing assembly comprising casing portions 67, 68 which are secured together at an intermediate flanged position 72 and carried, by means of a flange 74 integral with casing portion 67 by the flange 31 of the turbine casing, the wall 60 and flange 74 being proportioned to mate with each other and with the flange 31 to which they are suitably bolted as indicated in FIG. 5.

As best shown in FIGS. 2 and 6, the module 25 and the burner and air inlet assembly 14 may be oriented with their axes generally horizontal and at right angles to each other. In the angle between such components 25, 14, the Rankine turbine-Brayton compressor module, generally designated 90, and the construction of which is best shown in FIG. 4, is positioned with its axis generally perpendicular to the axis of components 25 and 14, that is, vertically, as the parts are shown in the drawing, although it will be recognized that the assembly might be turned to different positions in any given installation.

Shown at the top of the module 90 is the Rankine turbine assembly generally designated 15. The intake plenum casing 95 of turbine 15 contains an inlet nozzle ring 96 which guides the Rankine fluid to the impeller 98, from which the discharge is conducted axially through a generally cylindrical wall 99 to the exhaust plenum 100 which is contained in an upper casing portion 102, from which the exhaust is delivered through integral outlet passage portion 94 and connecting ducting portions 164, 165 to the regenerator 18, which will be referred to further hereinafter. The Rankine turbine assembly is secured to a flange 106 of a feed pump casing 105 which is interposed between and concentric with the Rankine turbine 15 and the Brayton compressor 12, and rigidly attached to both. Brayton compressor rotor 110 and turbine rotor 98 are both fast with respect to shaft 112. The impeller 114 of the feed pump 20 is also fast with respect to the shaft 112. The shaft 112 is hollow, and the hollow interior thereof communicates at its upper end with an axial passage 115 having a connecting nipple 116 at the upper end to which the conduit 120 (FIG. 6) is connected. The Rankine fluid is delivered to the pump rotor 114 from the interior of the shaft 112, and is discharged through the pump output passage 122, which is connected by conduit 123 to the finned heat exchange tubing 124 of the regenerator 18.

At its lower end a solid continuation portion 113 of the shaft 112 is connected to an extension shaft portion 126 having a gear 125 fast upon its lower end. Gear 125 is selectively driveable by a starter motor 130, through a conventional starting clutch 132 which when engaged drives the shaft assembly and the impellers 98, 110 through a step-up gear 133. A pinion 134 fast with respect to the gear 133 meshes with an idler gear 135 which drives a booster pump impeller 140 through a gear 136 fast on the shaft 141 of a booster pump assembly generally designated 150. The booster pump assembly draws Rankine fluid through an input nipple 142 concentric with the impeller 140 and which is located in a reservoir chamber housing 144. The reservoir chamber housing 144 and the starter, as well as the booster pump working elements, gearing etc., are carried by a combined bottom cover and housing-frame member 145 attached to an enlarged chamberdefining downwardly-extending portion 146 of the compressor body 91. The body portion 91 of the compressor also carries the integral input nipple 152 through which ambient air is conducted to the compressor. The compressor exhaust plenum 154 has a tangential outlet which directly connects via duct portion 155 with the outer end of the burner air jacket 45 outside the burner chamber 50 (FIG. 6).

From the burner the air and gases of combustion enter the inlet scroll chamber 44 of the Brayton turbine, and pass through the nozzle ring 47 to actuate the impeller of the Brayton main power turbine, as indicated.

The Rankine fluid which is heated in the tubes 38 of the heat exchanger 16 is conducted via conduit means 160 to the Rankine turbine inlet plenum chamber 97.

From the exhaust portion 94 of the Rankine turbine assembly the gas is taken into the previously mentioned conduit portions 164, 165, which are of flat rectangular cross section and which extend outwardly beneath the regenerator assembly 18 to a return bend portion, an extension 166 of which continues back above module 90 for a short distance, defining a relatively flat rectangular casing which contains the finned tubing 124 of the regenerator. After passing over the finned tubing within the regenerator, the gas is conducted through finned condenser tubes 170 incorporated in a relatively flat horizontal finned condenser having an output header defined by a box-like sheet metal enclosure 172 at its end opposite the regenerator casing 166. Header 172 is connected by tube 175 to the boost pump reservoir 144 from which, as indicated previously, the condensed fluid is conducted via conduit 120 and hollow shaft 112 to the feed pump 20.

By reason of the fact that the gas from the Rankine turbine normally possesses a certain amount of superheat, the fluid from the feed pump absorbs some heat from the gases in the regenerator prior to being delivered to the heat exchanger assembly. The Rankine fluid is taken via a conduit 167 from the regenerator tubing 124 to the input of the heat exchanger 16, where it is heated and subsequently delivered to the Rankine turbine via conduit means 160.

The three main modules may of course be mechanically positioned with respect to each other with the aid of any suitable struts and/or framework (omitted for clarity of illustration), in addition to which the ductwork and the burner/air inlet jacket 45 provide mechanical securance.

It will also be recognized that the housing components, being largely of circular form in the fluid-containing areas, lend themselves to effective sealing with the aid of simple gasketing means, as shown. The positioning of the feed pump 20 between the Rankine turbine and Brayton compressor and within the integrated structure of the module 90 also greatly aids the vitally important function of fluid retention.

A fan 180 may be provided driven by an electric motor 181 to augment the flow of convection cooling air over the condenser tubing. The condenser lies generally in a plane parallel to the axes of the module 25 and the burner and air inlet assembly 14.

This Detailed Description of Preferred Form of the Invention, and the accompanying drawings, have been furnished in compliance with the statutory requirement to set forth the best mode contemplated by the inventor of carrying out the invention. The prior portions consisting of the "Abstract of the Disclosure" and the "Background of the Invention" are furnished without prejudice to comply with administrative requirements of the Patent Office.

What is claimed is:

1. An integrated Brayton-Rankine cycle engine of the type designed for use with an organic Rankine fluid, comprising two power generating modules including a first module comprising a Rankine turbine and a rotary compressor driven thereby, a second module comprising a Brayton main power turbine having no driving connection with the compressor, said second module also including an intercycle heat exchanger heated by the exhaust of the Brayton turbine and delivering heat to the Rankine fluid for powering the Rankine turbine, a burner and air supply assembly connecting the two modules for delivering to the Brayton turbine air from the compressor together with products of combustion from the burner, characterized in that each of the said two modules is of substantially circular cross section, and means securing said modules closely together with their axes substantially perpendicular to each other.

2. In an engine as defined in claim 1, a generally flat condenser for the Rankine fluid closely secured to both modules and lying in a plane substantially perpendicular to the axis of one module and parallel to but spaced from the axis of the other module.

3. In an engine as defined in claim 1, a generally flat condenser for the Rankine fluid closely secured to both modules and lying in a plane substantially perpendicular to the axis of one module and parallel to but spaced from the axis of the other module and through which the Rankine fluid flows in a direction perpendicular to both axes.

4. An engine as defined in claim 3 wherein the condenser is substantially perpendicular to and extends across one end of the first module and the Rankine fluid from the turbine in said first module is conducted through the condenser and to a position beyond at least a part of the second module and returned around said second module to pumping means powered by the first module.

5. An integrated Brayton-Rankine cycle engine of the type having two power-producing modules, including a first module containing a single stage Rankine turbine and a single stage centrifugal compressor driven thereby, a second module containing a single stage Brayton turbine having no driving connection with the compressor, said second module also including an intercycle heat exchanger, an organic fluid for driving the Rankine turbine, and a third module containing a condenser for the Rankine fluid, a burner and air feeding assembly for conducting air and products of combustion from the compressor and burner assembly to the Brayton turbine, and means for delivering Rankine fluid from the Rankine turbine to the condenser, from the condenser to the heat exchanger and from the heat exchanger back to the Rankine turbine, means securing all of said modules closely together, said first and second modules being of generally circular cross section, and the axes of said first and second modules being substantially perpendicular to each other, said delivering means including a centrifugal feed pump in the first module, and shaft means extending between and providing a direct drive from the Rankine turbine to the compressor, said feed pump having an impeller fast on said shaft means at a position between said Rankine turbine and compressor, said means for delivering fluid from the condenser to the heat exchanger also including an axial passage in said shaft means.

6. Means as defined in claim 1 wherein the burner and air supply assembly forms a part of said means for securing the modules together.

* * * * *